(12) United States Patent
Nago

(10) Patent No.: US 6,671,270 B2
(45) Date of Patent: *Dec. 30, 2003

(54) WIRELESS COMMUNICATION SYSTEM AND CONTROL METHOD THEREFOR

(75) Inventor: Hidetada Nago, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/816,968

(22) Filed: Mar. 13, 1997

(65) Prior Publication Data

US 2002/0150125 A1 Oct. 17, 2002

(30) Foreign Application Priority Data

| Mar. 19, 1996 | (JP) | ............................................. 8-090267 |
| Mar. 4, 1997 | (JP) | ............................................. 9-048777 |

(51) Int. Cl.⁷ ................................................. H04J 3/06
(52) U.S. Cl. ........................ 370/350; 370/503; 375/356
(58) Field of Search ................................ 370/330, 350, 370/480, 503, 504, 505, 506, 507, 508, 509, 337, 347, 328; 375/132, 134, 137, 356

(56) References Cited

U.S. PATENT DOCUMENTS

| 4,247,018 | A | | 1/1981 | Credle .......................... 222/1 |
| 5,059,954 | A | | 10/1991 | Beldham et al. ............. 340/614 |
| 5,285,443 | A | * | 2/1994 | Patsiokas et al. ............ 370/280 |
| 5,509,027 | A | * | 4/1996 | Vook et al. .................. 375/202 |
| 5,862,142 | A | * | 1/1999 | Takiyasu et al. ............. 370/480 |
| 5,870,391 | A | * | 2/1999 | Nago .......................... 370/330 |

FOREIGN PATENT DOCUMENTS

| JP | 647825 | 1/1989 |
| JP | 4306924 | 10/1992 |
| JP | 07023467 | 1/1995 |
| JP | 08026587 | 1/1996 |

* cited by examiner

*Primary Examiner*—Chi Pham
*Assistant Examiner*—Alexander O. Boakye
(74) *Attorney, Agent, or Firm*—Fitzpatrick, Cella, Harper & Scinto

(57) ABSTRACT

A wireless communication apparatus which performs communication control on wireless communication apparatuses in a predetermined cell of a predetermined range. When information on synchronization transmitted from a wireless communication apparatus in the adjacent cell has been received, frame/communication synchronization is established with respect to the adjacent cell, and communication control is performed in the predetermined cell, based on the information. Upon transmitting information for synchronization to the wireless communication apparatuses in the cell, the information is sent in a time slot, different from a time slot used for receiving the synchronizing information from the wireless communication apparatus in the adjacent cell, in the same communication frame.

27 Claims, 10 Drawing Sheets

FIG.5A SYSTEM CONTROL CHANNEL (CNT1, CNT2)

| CS | PR | SYN | ID | BF | WA | NF | CNT STATE | CRC | GT |
|----|----|-----|----|----|----|----|-----------|-----|----|
| 8 | 56 | 32 | 64 | 8 | 8 | 8 | 8 | 16 | 33 |

FIG.5B LOGIC CONTROL CHANNEL (LCCH)

| CS | PR | UW | DA | DATA | CRC | CF |
|----|----|----|----|------|-----|-----|
| 24 | 56 | 24 | 8 | 128 | 16 | 80 |

FIG.5C DATA CHANNEL

| CF | CS | PR | UW | DA | DATA | GT |
|----|----|----|----|----|------|-----|
| 80 | 24 | 56 | 24 | 8 | 4360 | 72 |

FIG.5D VOICE CHANNEL

| CS | PR | UW | T/R | CRC | GT |
|----|----|----|-----|-----|-----|
| 24 | 56 | 24 | 320 | 16 | 32 |

FIG.5E END

| CF |
|----|
| 85 | ature.

WIRELESS COMMUNICATION SYSTEM AND CONTROL METHOD THEREFOR

BACKGROUND OF THE INVENTION

This invention relates to a wireless communication system and, more particularly to frame synchronization between adjacent cells.

DESCRIPTION OF RELATED ART

In a wireless communication system, adjacent cells must perform communication in synchronization with each other so as to avoid collision between communication frames, which may disable wireless communication.

For example, in a frequency-hopping method which performs communication while changing frequencies, if adjacent cells respectively change frequencies at different timings, the adjacent cells may use the same frequencies at the same time, which disturbs communication performed in the adjacent cells.

Conventionally, in a communication system such as a wireless communication LAN, to establish frame synchronization between adjacent cells, the control stations of the respective cells are connected with a cable, and frame synchronizing signals are sent by the cable.

However, the above system requires a circuit for sending/receiving frame-synchonizing information on the cable as well as wireless communication system circuits, which increases complexity of hardware construction.

SUMMARY OF THE INVENTION

The present invention has been made in consideration of the above situation, and has its object to establish frame synchronization between adjacent cells with a simple construction.

Another object of the present invention is to establish frame synchronization between adjacent cells without a cable system.

Further, another object of the present invention is to control adjacent cells to perform frequency change in synchronization with each other, using a simple construction.

Further, another object of the present invention is to control adjacent cells to perform frequency change in synchronization with each other, only with wireless communication system.

Further, another object of the present invention is to realize a simple construction for wireless communication.

Further, another object of the present invention is to avoid disturbing communication performed in adjacent cells.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A to 5E respectively show the structures of respective channel constituting the wireless communication frame;

DETAILED DESCRIPTION OF THE PREFERRED EMBODIMENTS

Preferred embodiments of the present invention will now be described in detail in accordance with the accompanying drawings.

Figure 1:
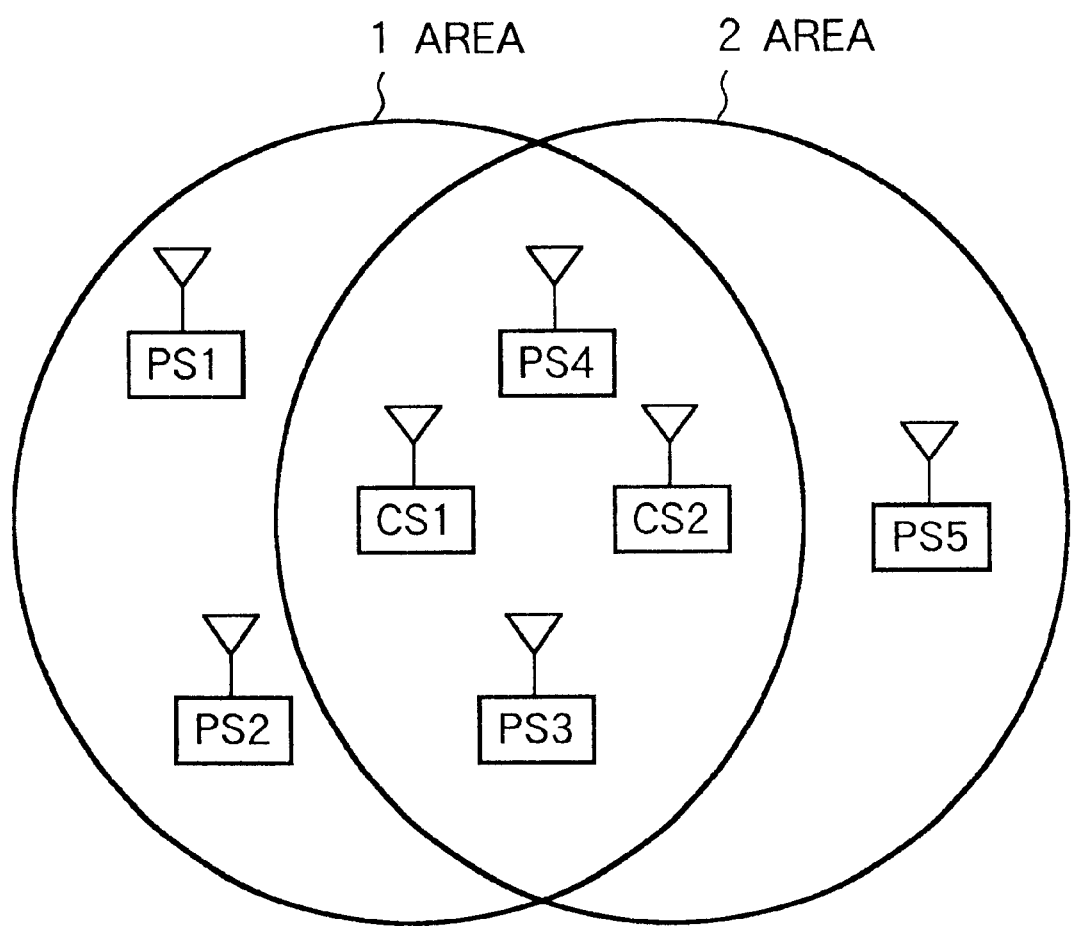
FIG. 1 is a schematic view showing the construction of a wireless communication system according to an embodiment of the present invention.

FIG. 1 shows the construction of a wireless communication system using a frequency hopping method according to an embodiment of the present invention.

In FIG. 1, reference numeral CS1 denotes a control station which performs communication control within a cell 1; CS2, a control station which performs communication control within a cell 2.

Numerals PS1 to PS3 denote wireless communication terminals which perform wireless communication under the control of the control station CS1; and PS4 and PS5, wireless communication terminals which perform wireless communication under the control of the control station CS2.

Figure 2:
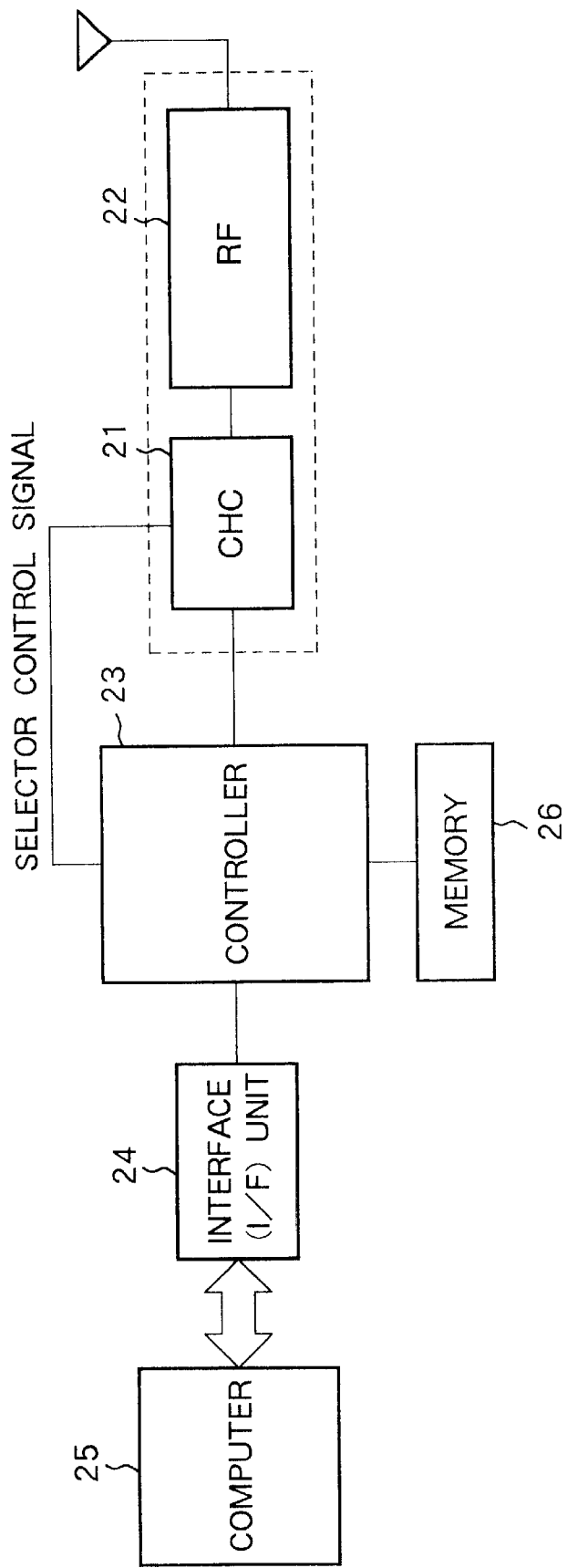
FIG. 2 is a block diagram showing the construction of a control station of the embodiment.

FIG. 2 shows the construction of the control station of the embodiment.

In FIG. 2, a channel CODEC (CHC) 21 sends a received signal, in a predetermined format, to a controller 23, and sends a signal from the controller 23, in a predetermined format, to a wireless communication (RF) unit 22.

The wireless communication unit 22 performs an electric wave transmission/reception. The controller 23 controls the respective elements as a control station, and manages transmission/reception data. Numeral 24 denotes an interface (I/F) unit for transferring/receiving transmission/reception data with a computer (PC) 5 and the like.

Numeral 26 denotes a memory in which a plurality of hopping patterns and control programs executed by the controller 23 are stored.

Figure 3:
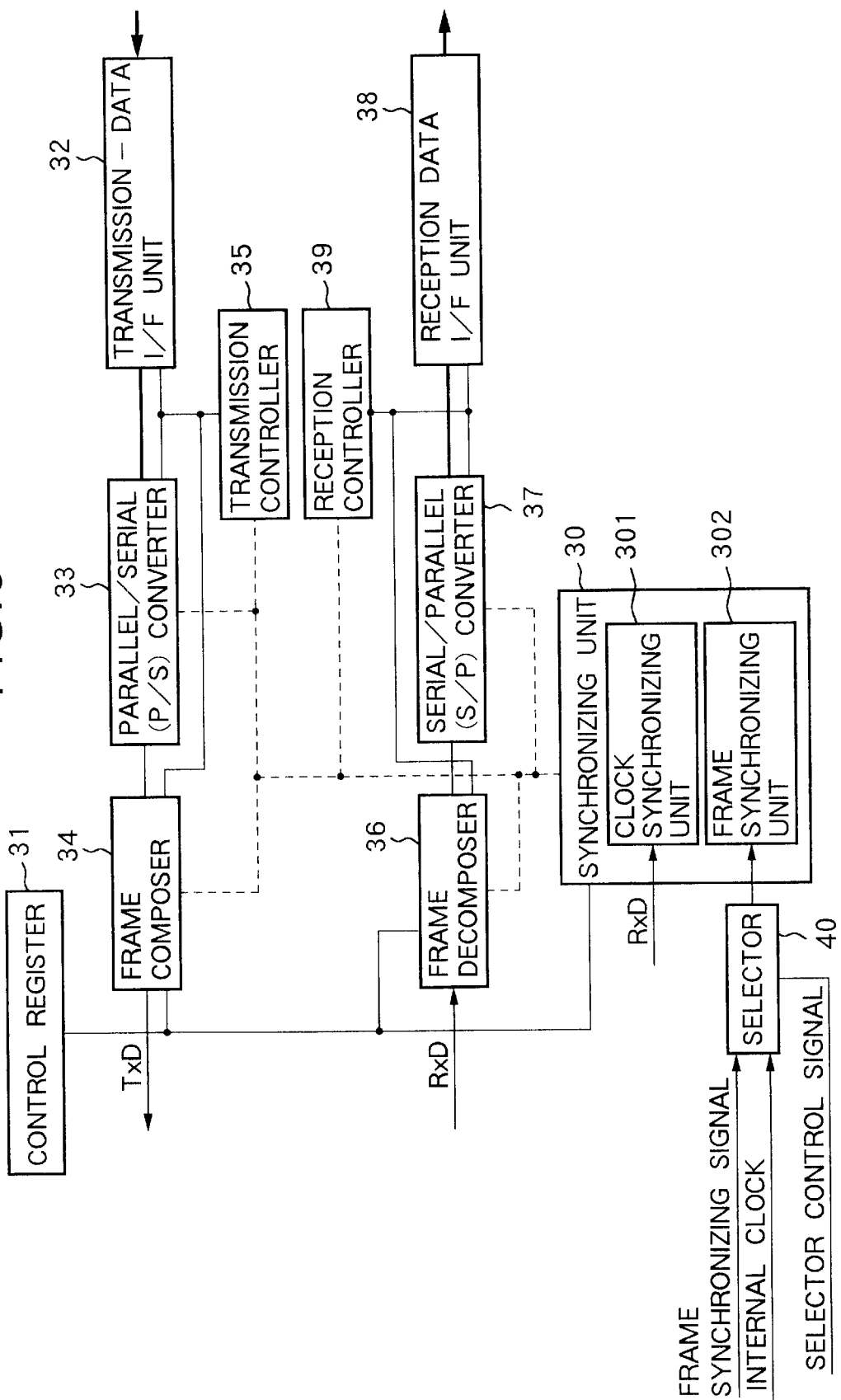
FIG. 3 is a block diagram showing the construction of a channel CODEC of the embodiment.

FIG. 3 shows the construction of the channel CODEC (CHC) 21 of the control station according to the embodiment.

In FIG. 3, numeral 31 denotes a control register for setting parameters necessary for channel encoding/decoding; 32, a transmission-data interface (I/F) unit for inputting transmission data from the controller 23 into the channel CODEC 21; 33, a parallel/serial (P/S) converter which converts parallel data from the transmission-data I/F unit 32 into serial data; and 34, a frame composer which processes data from the P/S converter 33 into frame data and sends the frame data to the RF unit 22.

Numeral 35 denotes a transmission controller which controls transmission-data I/F unit 32, the parallel/serial converter 33 and the frame composer 34; 36, a frame decomposer which detects parameters added to the frame generated from the data received by the wireless communication unit 22, and obtains only data; 37, a serial/parallel (S/P) converter which converts a serial signal from the frame decomposer 36 into a parallel signal; and 38, a reception-data interface (I/F) unit which outputs the signal from the serial/parallel converter 17 to the controller 23.

Numeral 39 denotes a reception controller which controls the frame decomposer 36, the serial/parallel converter 37, and the reception-data I/F unit 38; 30, a synchronizing unit having a clock synchronizing unit 301 and a frame synchronizing unit 302; and 31, a selector which switches an internal clock of the channel CODEC 21 and an external frame synchronizing signal.

Figure 4:
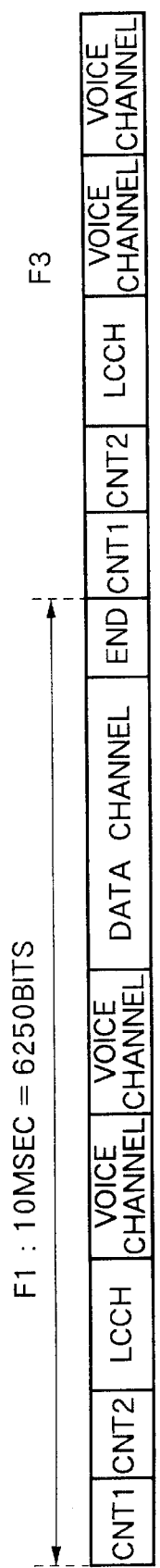
FIG. 4 shows the structure of a wireless communication frame used in wireless communication system of the embodiment.

FIG. 4 shows the structure of a wireless communication frame used in the wireless communication system of the present embodiment.

As shown in FIG. 4, the wireless communication frame has two system-control channels CNT1 and CNT2, a logic-control channel LCCH for transmitting/receiving control information such as line-control information, two voice channels for bidirectionally transmitting/receiving voice data, a data channel for data communication, and an END for providing a guard time for changing a frequency by a frequency hopping method.

The system-control channel CNT1 is transmitted by the control station (based control station) as a base for synchronizing timing. The other control stations perform communication by the frequency hopping within the cell in synchronization with system-control channel CNT1.

That is, the control station (sub control station) that receives the system-control channel CNT1 transmits the system-control channel CNT2 at timing designated by the system-control channel CNT1 so as to perform communication within the cell at the timing designated by the system-control channel CNT1.

The wireless communication terminal that performs communication under the control of the sub control station receives the system-control channel CNT2 transmitted by the sub control station, and changes its frequency at timing designated by the system-control channel CNT2 and performs communication.

Thus, the frequency change in the cell under the control of the base control station and that in the cell under the control of the sub control station can be performed in synchronization with each other.

FIGS. 5A to 5E show the detailed constructions of the respective channel constituting the wireless communication frame of the embodiment.

In FIGS. 5A to 5E, a field CS is a carrier sense field used for carrier sensing. A field PR is a preamble field for ensuring bit synchronization. A field SYN contains a synchronizing word for ensuring frame synchronization. A field ID contains an identification number of the system.

Further, a field BF contains time information (base frame) to be referred upon frequency hopping. A field WA contains a command instructing a terminal in a sleep mode to start. A field NF indicates the frequency to be subjected to the next hopping. A field CNTState contains information indicative of system-control channel 1 or 2 as the present system control channel.

A field CRC contains a CRC check sum for detecting an error. A field GT indicates guard time for absorbing time rag in transmission/reception time. A field UW contains a unique word for data detection within the respective channels. A field DA contains a terminal number of a transmission-destination.

A field Data is used for storing data. A field T/R contains voice data transmitted of the voice channel. A field CF indicates guard time necessary for frequency change by the frequency hopping.

Figure 6:
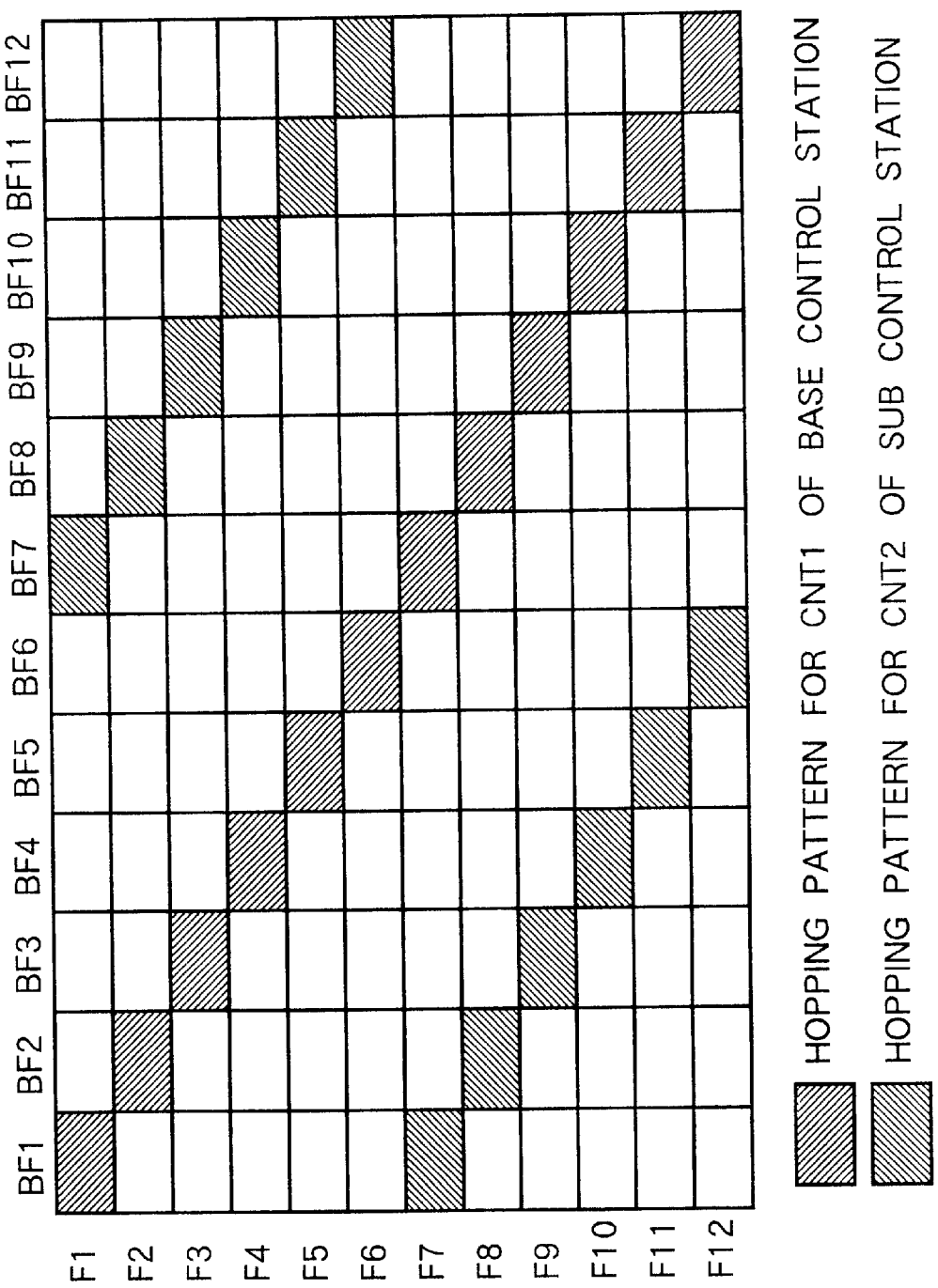
FIG. 6 is a table showing a frequency hopping pattern for communicating data control channels according to the embodiment.
Figure 7:
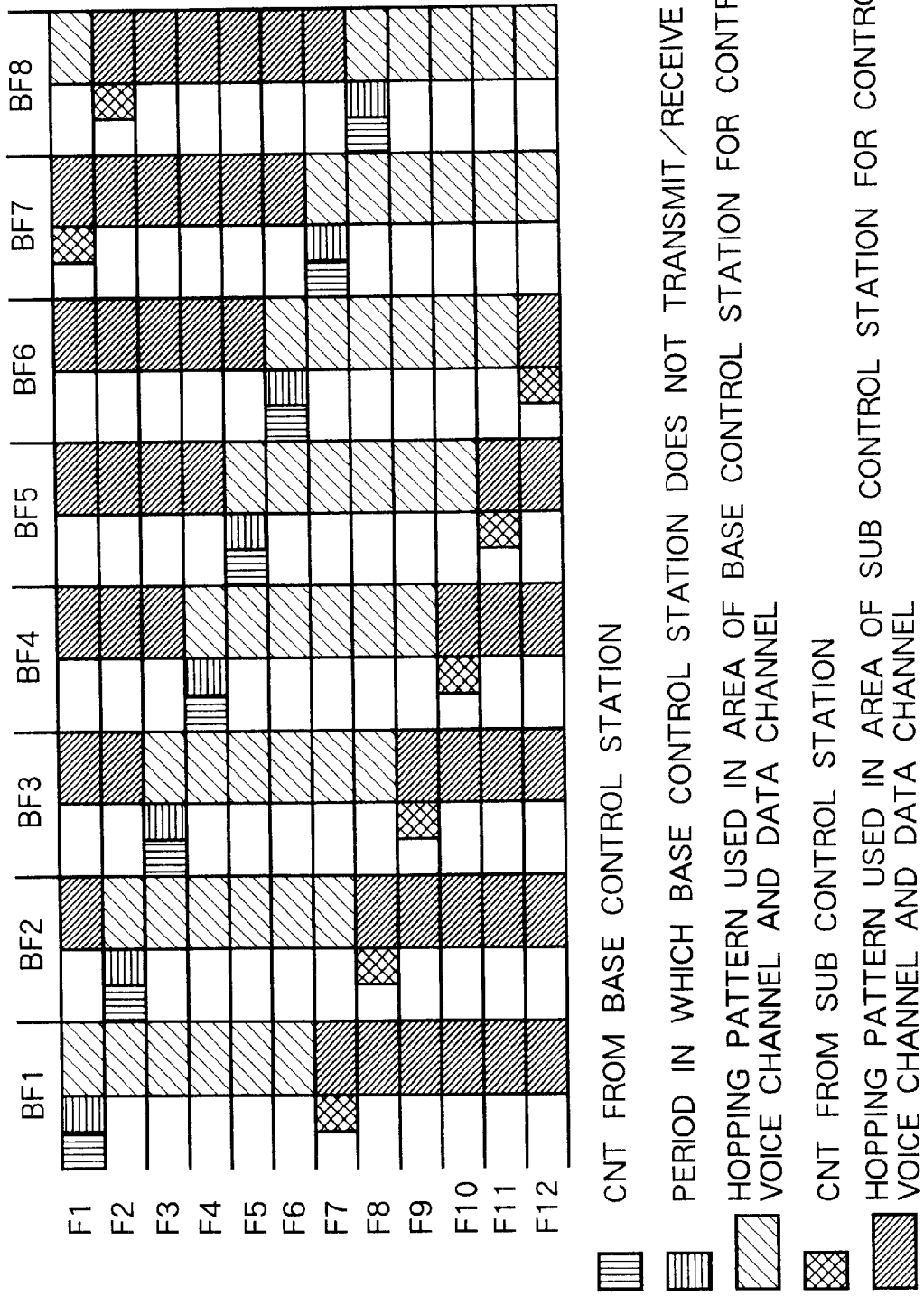
FIG. 7 is a table showing assignment of frequencies for each control station according to the embodiment.
Figure 9:
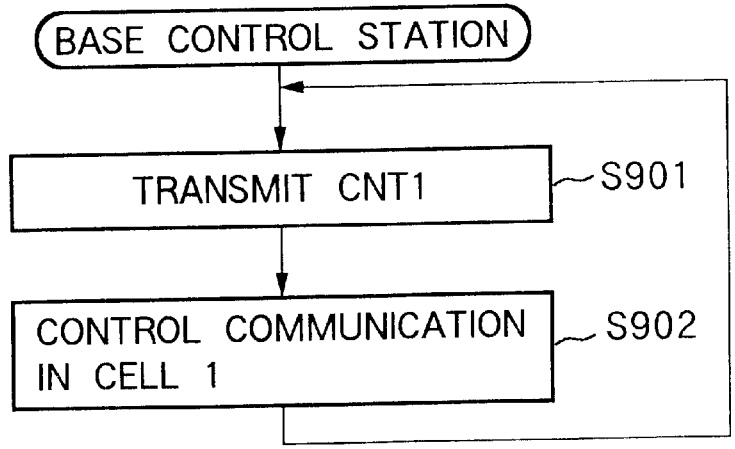
FIG. 9 is a flowchart showing the operation of the base control station of the embodiment.
Figure 10:
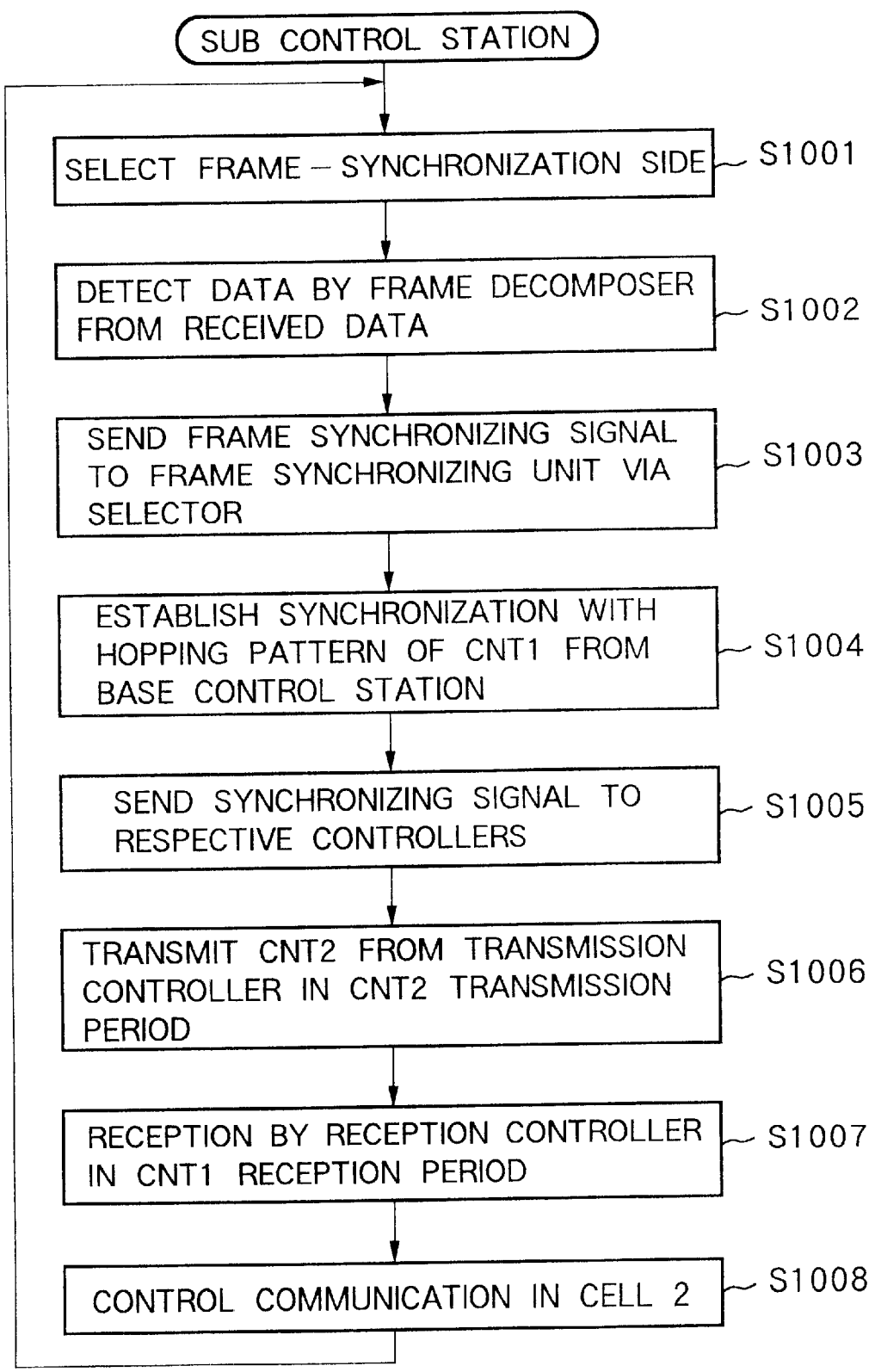
FIG. 10 is a flowchart showing the operation of the sub control station of the embodiment.
Figure 11:
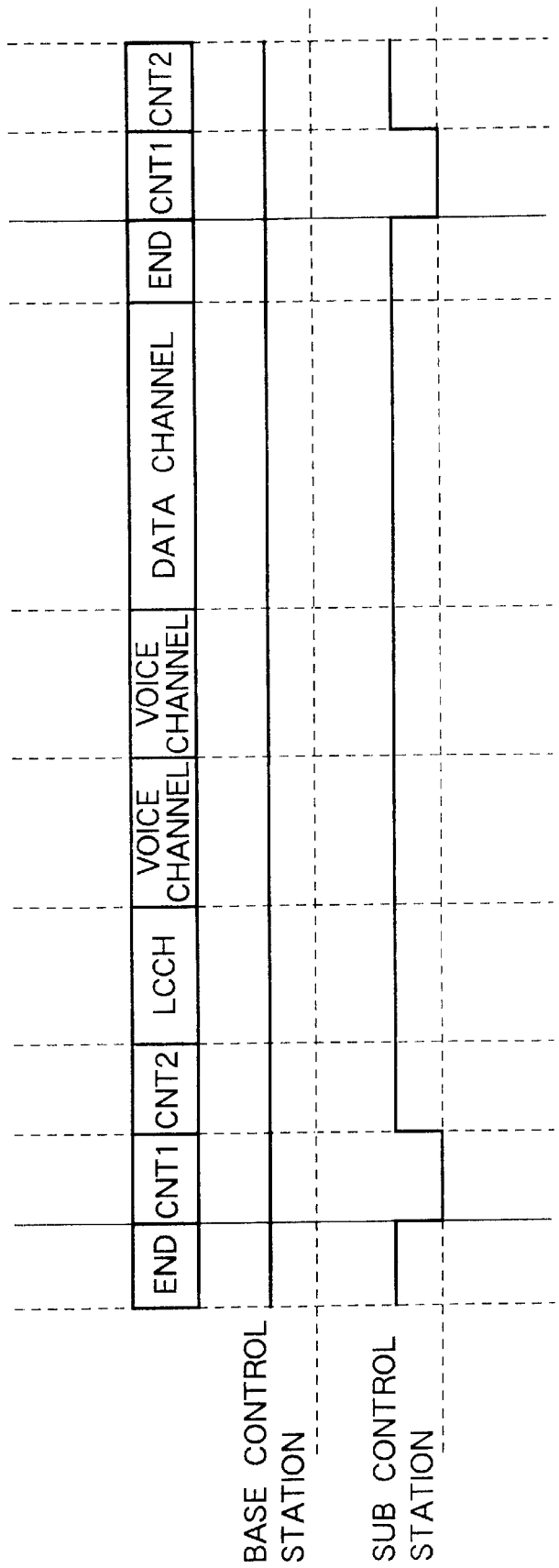
FIG. 11 is shows the statuses of selector control signals from a channel CODEC of the embodiment for the respective control stations.

Operation of the embodiment will be described below referring to FIGS. 6–11. FIG. 6 is a table showing a frequency according to the embodiment. FIG. 7 is a table showing an assignment of frequencies for each control station according to the embodiment. FIG. 11 is a diagram showing the statuses of selector control signals from a channel CODEC of the embodiment for the respective control stations.

Figure 8:
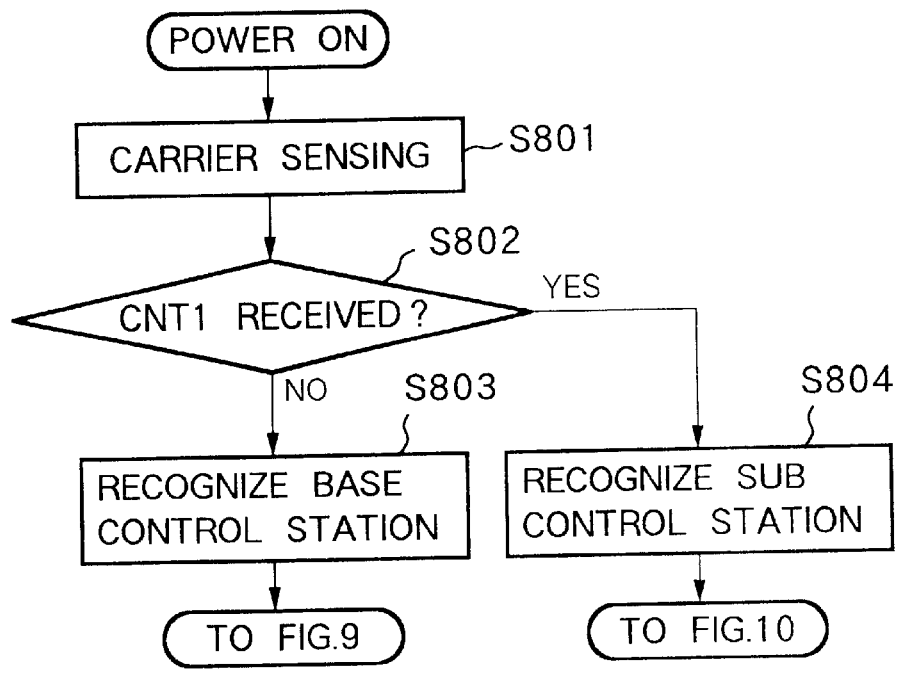
FIG. 8 is a flowchart showing determination of base control station or sub control station according to the embodiment.

FIG. 8 is a flowchart showing for determination of base control station or sub control station according to the embodiment. FIG. 9 is a flowchart showing the operation of the base control station. Further, FIG. 10 is a flowchart showing the operation of the sub control station.

In FIG. 8, when a control station is set, the control station performs carrier sensing at step S801, to examine whether or not communication is performed in adjacent cells.

As a result of carrier sensing, if it is determined that the adjacent cells perform communication, it is determined at step 802 whether or not the system-control channel CNT1 has been received. If YES, as the base control station already exists, the control station recognizes itself as a sub control station at step S804. In the present embodiment, the control station CS2 in FIG. 1 recognizes itself as the sub control station.

At step S802, if it is determined that the system-control channel CNT1 has not been received, since no base control station exists, the control station recognizes itself as the base control station at step S803. In the present embodiment, the control station CS1 in FIG. 1 recognizes itself as the base control station.

In FIG. 9, the control station CS1 as the base control station transmits the system-control channel CNT1 in the period of channel CNT1 in FIGS. 7 and 11, while it does not transmit the system-control channel CNT2 in the period of channel CNT2. The control station CS1 performs transmission/reception of the logic-control channel (LCCH), controls communication of the wireless communication terminals within the cell 1, and changes the frequencies in accordance with a hopping pattern for the voice channel and a hopping pattern for the data channel in response to a communication request.

The control station CS2, which has been set after the base control station was set, recognized as the sub control station, first starts as the terminal in the cell 1 of the base control station CS1, and is registered in the base control station CS1 as the terminal in the cell 1. Thereafter, the control station CS2 informs the base control station CS1 using the logic-control channel LCCH that the control station CS2 operates as the sub control station of the base control station CS1.

In response to this information, the base control station CS1 selects hopping patterns for the sub control station CS2, from the plurality of hopping patterns stored in the memory 26. In this selection, the hopping patterns used for communication by the terminals in the cell 2 to which the sub control station CS2 belongs are selected, as well as a hopping pattern used for the sub control station CS2 to transmit the system-control channel CNT2 is selected.

FIGS. 6 and 7 show the hopping pattern assigned. The frequency hopping for communication of CNT1 and CNT2 is performed using the hopping pattern indicated in FIG. 6. Assignment of frequencies used for performing frequency hopping in each cell is shown in FIG. 7. That is, when a base frame BF1 is selected, the base control station uses frequencies F1 to F6, while the sub control station uses frequencies F7 to F12. When the base frame BF2 is selected, the base control station uses the frequencies F2 to F7, while the sub control station uses the frequencies F8 to F12.

Note that when the base control station CS1 selects a hopping pattern for the sub control station CS2, if a terminal which performs communication by the hopping pattern exists, the completion of the communication by the terminal is waited. When the communication has been completed and the hopping pattern has been released, the hopping pattern is assigned to the sub control station CS2. Thereafter, after the base control station CS1 are notified of the hopping pattern, it manages the hopping pattern so as not to assign the hopping pattern to the terminals in the cell 1.

If the terminals in the cell 1 do not use the hopping pattern assigned to the sub control station CS2, the base control station CS1 informs the sub control station CS2 of the hopping pattern assigned for transmitting the system-control channel CNT2 and the hopping patterns assigned for communication by the terminals in the cell 2. Then the sub control station CS2 operates as a control station using the designated hopping pattern.

The sub control station CS2 that started to operate as the control station for cell 2 receives the system-control channel CNT1 in accordance with the transmission hopping pattern of the system-control channel CNT1 of the base control station CS1, establishes frame synchronization with the base control station CS1, and transmits the system-control channel CNT2 in accordance with the hopping pattern assigned for the system-control channel CNT2 which is synchronized with the established frame synchronizing timing.

That is, in FIG. 10, in the sub control station CS2, the selector 31 of the channel CODEC (CHC) 21 is switched to input the frame synchronizing signal into the frame synchronizing unit 302 at step S1001. At step S1002, the frame decomposer 36 detects the system-control channel CNT1, transmitted by the base control station CS1, from the received data. At step S1003, the frame synchronizing signal corresponding to the system-control channel CNT1 is sent to the frame synchronizing unit 302 of the selector 31. At step S1004, the frame synchronizing unit 302 establishes frame synchronization, in synchronization with the system-control channel CNT1.

After the frame synchronization has been established, the synchronizing unit 30 notifies the transmission controller 35 and the reception controller 39 of the establishment of frame synchronization at step S1005 so that the respective controllers can operate in synchronization with each other.

At step S1006, the transmission controller 35 transmits the system-control channel CNT2 in the period for transmitting the system-control channel CNT2. On the other hand, at step S1007, the reception controller 39 receives the system-control channel CNT1 transmitted by the base control station CS1 in the period for transmitting the system-control channel CNT1, and maintains the frame synchronization with respect to the base control station CS1. Note that communication format for channels CNT1 and CNT2 are as shown in FIGS. 7 and 11. At step S1008, the sub control station CS2 performs communication control of the wireless communication terminals in the cell 2, in synchronization with communication under the control of the base control station CS1. That is, in step S1008, after the transmission/reception of the logic-control channel in the cell 2 has been completed, the sub control station CS2 changes the frequencies in accordance with a hopping pattern for the voice channel and a hopping pattern for the data channel in response to a communication request.

Regarding wireless communication terminals which can receive both system-control channel CNT1 and CNT2 from the base control station CS1 and the sub control station CS2, to establish frame synchronization, one of the two system control channels is selected in initial setting. Then, frame synchronization is established by the corresponding system control channel.

Further, the sub control station is set when terminals are located outside of a communication area of the base control station.

As described above, according to the present invention, frame synchronization can be established between adjacent cells with a simple construction.

That is, frame-synchronizing information can be transmitted/received between cells, only with normal wireless communication system circuits, but without a cable system.

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (Operating System) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

The present invention is not limited to the above embodiments and various changes and modifications can be made within the spirit and scope of the present invention.

Therefore, to appraise the public of the scope of the present invention, the following claims are made.

What is claimed is:

1. A wireless communication system having a first control apparatus which performs communication control on a wireless communication apparatus in a first cell, and a wireless communication apparatus performing wireless communication based on the communication control by said first control apparatus, wherein said first control apparatus comprising:

first reception means for wireless communication receiving first synchronizing information transmitted from a second control apparatus which performs communication control on a wireless communication terminal in a second cell different from the first cell;

synchronizing means for establishing synchronization with a signal from said second control apparatus, based on the first synchronizing information received by said first reception means; and transmission means for transmitting second synchronizing information to the wireless communication apparatus in the first cell, in synchronization with the signal from said second control apparatus, established by said synchronizing means, and wherein said wireless communication apparatus comprising:

second reception means for receiving the second synchronizing information transmitted from said first control apparatus; and communication means for performing communication in synchronization with the signal from said first control apparatus, based on the second synchronizing information received by said second reception means.

2. The wireless communication system according to claim 1, wherein said first control apparatus is a control apparatus which has been established after said second control apparatus was established.

3. The wireless communication system according to claim 1, wherein said wireless communication system wireless communication transmits/receives information including control information by using time slots in a communication frame, and wherein said transmission means transmits the second synchronizing information using a time slot different from a time slot in which the first synchronizing information has been received.

4. The wireless communication system according to claim 1, wherein said wireless communication system performs communication by using a frequency hopping method.

5. The wireless communication system according to claim 4, wherein said transmission means performs transmission using a frequency hopping pattern different from a frequency hopping pattern for reception by said first reception means.

6. The wireless communication system according to claim 1, wherein said synchronizing means establishes the synchronization with timing at which said second control apparatus changes a frequency, based on the first synchronizing information received by said first reception means.

7. The wireless communication system according to claim 6, wherein said transmission means transmits the second synchronizing information to the wireless communication apparatus in the first cell, at the timing synchronized by said synchronizing means.

8. A control method for a wireless communication system having a first control apparatus which performs communication control on a wireless communication apparatus in a first cell, and a wireless communication apparatus performing wireless communication based on the communication control by said first control apparatus, wherein with respect to said first control apparatus, said method comprising:

a first reception step of wireless communication receiving first synchronizing information transmitted from a second control apparatus which performs communication control on a wireless communication apparatus in a second cell different from the first cell;

a synchronizing step of establishing synchronization with a signal from said second control apparatus, based on the first synchronizing information received at said first reception step; and a transmission step of transmitting second synchronizing information on synchronization to the wireless communication apparatus in the first cell, in synchronization with the signal from said second control apparatus, established at said synchronizing step, and wherein with respect to said wireless communication apparatus, said method comprising:

a second reception step of receiving the second synchronizing information transmitted from said first control apparatus; and a communication step of performing communication in synchronization with the signal from said first control apparatus, based on the second synchronizing information received at said second reception step.

9. The control method according to claim 8, wherein said wireless communication system wireless communication transmits/receives information including control information by using time slots in a communication frame, and wherein at said transmission step, the second synchronizing information is transmitted using a time slot different from a time slot in which the first synchronizing information has been received.

10. The control method according to claim 8, wherein said wireless communication system performs communication by using a frequency hopping method.

11. The control method according to claim 10, wherein at said synchronizing step, the synchronization with timing at which said second control apparatus changes a frequency is established, based on the first synchronizing information received at said first reception step.

12. The control method according to claim 11, wherein at said transmission step, the second synchronizing information is transmitted to the wireless communication apparatus in the first cell, at the timing synchronized at said synchronizing step.

13. The control method according to claim 10, wherein at said transmission step, transmission is performed with a frequency hopping pattern different from a frequency hopping pattern for reception at said first reception step.

14. A wireless communication apparatus, comprising:

reception means for receiving first synchronizing information, transmitted in a wireless manner from a first wireless communication apparatus;

synchronizing means for establishing synchronization with said first wireless communication apparatus, based on the first synchronizing information received by said reception means; and transmission means for transmitting second synchronizing information in a wireless manner to a second wireless communication apparatus in synchronization with said first wireless communication apparatus, established by said synchronizing means, wherein said wireless communication apparatus is a first control station which performs communication control in a first cell, and wherein said reception means receives the first synchronizing information transmitted by a second control station which performs communication control in a second cell, and wherein said wireless communication apparatus has been established as the first control station after the second control station which performs communication control in the second cell was established.

15. A wireless communication apparatus which transmits first synchronizing information for performing a synchronizing control, comprising:

determination means for determining whether said wireless communication apparatus operates as a base control station which performs a synchronizing processing, or operates as a sub-control station which synchronizes with second synchronizing information transmitted by an external control apparatus, said second synchronizing information being utilized for another wireless communication apparatus to perform a synchronizing control; and transmission means for transmitting the first synchronizing information independently from the second synchronizing information when said determination means determines that the wireless communication apparatus is to operate as the base control station, and transmitting the first synchronizing information synchronizing with the second synchronizing information when said determination means determines that the wireless communication apparatus is to operate as the sub-control station.

16. The wireless communication apparatus according to claim 15, wherein said wireless communication apparatus is a control station which performs communication control in a first cell of a wireless communication system.

17. The wireless communication apparatus according to claim 16, wherein said external control apparatus is a control station which performs communication control in a second cell of the wireless communication system.

18. The wireless communication apparatus according to claim 17, wherein said determination means performs the determination based on whether or not the second synchronizing information is received from the external control apparatus.

19. The wireless communication apparatus according to claim 15, wherein the wireless communication apparatus performs communication by using a frequency hopping method.

20. The wireless communication apparatus according to claim 19, wherein the first and second synchronizing information is used for synchronizing timings of changing frequencies.

21. The wireless communication apparatus according to claim 19, wherein said transmission means performs transmission with a frequency hopping pattern different from a frequency hopping pattern for reception of the second synchronizing information.

22. A control method for a wireless communication apparatus which transmits first synchronizing information for performing a synchronizing control, the method comprising the steps of:

determining whether said wireless communication apparatus operates as a base control station which performs a synchronizing processing, or operates as a sub-control station which synchronizes with second synchronizing information transmitted by an external control apparatus, said second synchronizing information being utilized for another wireless communication apparatus to perform a synchronizing control; and transmitting the first synchronizing information independently from the second synchronizing information when the determination step determines that the wireless communication apparatus is to operate as the base control station, and transmitting the first synchronizing information synchronizing with the second synchronizing information when the determination step determines that the wireless communication apparatus is to operate as the sub-control station.

23. The method according to claim 22, wherein the wireless communication apparatus performs communication by using a frequency hopping method.

24. The method according to claim 23, wherein the first and second synchronizing information is used for synchronizing timings of changing frequencies.

25. The method according to claim 23, wherein, in said transmission step, transmission is performed with a frequency hopping pattern different from a frequency hopping pattern for reception of the second synchronizing information.

26. A wireless communication apparatus comprising:

communication means for performing frequency hopping communication with a communication device in a second network, and for performing frequency hopping communication with a communication device in a first network; and control means for synchronizing a frequency change in communication in the first network with a frequency change in communication in the second network based on a signal transmitted from the communication device in the first network, received by the apparatus using a frequency hopping communication.

27. A wireless communication method for a wireless communication apparatus, comprising:

a communication step of performing frequency hopping communication with a communication device in a second network, and performing frequency hopping communication with a communication device in a first network; and control step of synchronizing a frequency change in communication in the first network with a frequency change in communication in the second network based on a signal transmitted from the communication device in the first network, received by the apparatus using a frequency hopping communication.

* * * * *